United States Patent
Lin et al.

(10) Patent No.: US 11,196,917 B2
(45) Date of Patent: *Dec. 7, 2021

(54) ELECTRONIC SYSTEM WITH EYE PROTECTION

(71) Applicant: PixArt Imaging Inc., Hsin-Chu County (TW)

(72) Inventors: Han-Chang Lin, Hsin-Chu County (TW); Guo-Zhen Wang, Hsin-Chu County (TW); Nien-Tse Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,372

(22) Filed: Sep. 15, 2020

(65) Prior Publication Data

US 2020/0412941 A1 Dec. 31, 2020

Related U.S. Application Data

(63) Continuation of application No. 16/717,174, filed on Dec. 17, 2019, now Pat. No. 10,812,706, which is a continuation of application No. 15/821,891, filed on Nov. 24, 2017, now Pat. No. 10,574,878, which is a continuation of application No. 15/253,453, filed on Aug. 31, 2016, now Pat. No. 9,854,159, which is a continuation-in-part of application No. 13/934,311, filed on Jul. 3, 2013, now abandoned.

(30) Foreign Application Priority Data

Jul. 20, 2012 (TW) .................. 101126421

(51) Int. Cl.
| | |
|---|---|
| *H04N 5/232* | (2006.01) |
| *G06K 9/00* | (2006.01) |
| *G06F 3/01* | (2006.01) |
| *G02B 27/00* | (2006.01) |

(52) U.S. Cl.
CPC ..... *H04N 5/23219* (2013.01); *G02B 27/0093* (2013.01); *G06F 3/013* (2013.01); *G06K 9/00228* (2013.01); *G06K 9/00597* (2013.01); *H04N 5/23218* (2018.08); *H04N 5/23293* (2013.01)

(58) Field of Classification Search
None
See application file for complete search history.

(56) References Cited

U.S. PATENT DOCUMENTS 5,689,575 A * 11/1997 Sako .................. G06K 9/00228
382/118
9,594,945 B2 * 3/2017 Park ........................ G06F 3/012
9,750,407 B2 * 9/2017 Wu ....................... G06Q 10/109
(Continued)

*Primary Examiner* — Stefan Gadomski
(74) *Attorney, Agent, or Firm* — WPAT, PC

(57) ABSTRACT

An electronic system including a display device, an image sensor, a face detection engine, an eye detection engine and an eye protection engine is provided. The image sensor captures an image. The face detection engine recognizes a user face in the image. The eye detection engine recognizes user eyes in the image. The eye protection engine turns off the display device when the user eyes are recognized in the image but the user face is not recognized in the image.

20 Claims, 9 Drawing Sheets

(56) References Cited

U.S. PATENT DOCUMENTS

| | | | |
|---|---|---|---|
| 2006/0001682 A1* | 1/2006 | Honda | G06T 3/0093 |
| | | | 345/646 |
| 2007/0279373 A1* | 12/2007 | Tseng | H04N 21/41407 |
| | | | 345/102 |
| 2008/0055228 A1* | 3/2008 | Glen | G09G 5/10 |
| | | | 345/102 |
| 2009/0278828 A1* | 11/2009 | Fletcher | G06F 1/3203 |
| | | | 345/207 |
| 2010/0094501 A1* | 4/2010 | Kwok | B60J 3/04 |
| | | | 701/36 |
| 2012/0162110 A1* | 6/2012 | Kobayashi | G09G 3/3406 |
| | | | 345/173 |
| 2012/0182275 A1* | 7/2012 | Chen | G09G 5/10 |
| | | | 345/207 |
| 2015/0269709 A1* | 9/2015 | Zhao | G09G 3/2096 |
| | | | 345/589 |
| 2016/0180801 A1* | 6/2016 | Lee | G09G 5/003 |
| | | | 345/156 |
| 2016/0314762 A1* | 10/2016 | Lee | G09G 3/20 |
| 2016/0349839 A1* | 12/2016 | Ohba | G02B 27/0172 |
| 2016/0360268 A1* | 12/2016 | Zhao | H04N 21/44222 |
| 2017/0011678 A1* | 1/2017 | Cao | G09G 3/3406 |
| 2017/0039919 A1* | 2/2017 | Wu | G09G 5/10 |
| 2017/0047019 A1* | 2/2017 | Li | G09G 3/3406 |
| 2017/0079118 A1* | 3/2017 | Chen | H05B 47/11 |
| 2017/0318227 A1* | 11/2017 | Hsu | H04N 5/23219 |

\* cited by examiner

ELECTRONIC SYSTEM WITH EYE PROTECTION

CROSS REFERENCE TO RELATED APPLICATION

This application is a continuation application of U.S. patent application Ser. No. 16/717,174 filed on, Dec. 17, 2019, which a continuation application of U.S. patent application Ser. No. 15/821,891 filed on, Nov. 24, 2017, which is a continuation application of U.S. patent application Ser. No. 15/253,453 filed on, Aug. 31, 2016, which is continuation-in-part application of U.S. patent application Ser. No. 13/934,311 filed on, Jul. 3, 2013, and claims the priority benefit of Taiwan Patent Application Serial Number 101126421, filed on Jul. 20, 2012, the full disclosure of which is incorporated herein by reference.

BACKGROUND

1. Field of the Disclosure

This disclosure generally relates to an image system and, more particularly, to an image system with the eye protection and an operating method thereof.

2. Description of the Related Art

Interactive control mechanism can provide users a more instinctive control and thus it has been broadly applied to various multimedia systems, especially to an image display system having a display screen.

It is a general method to use a remote controller capable of capturing images as an interactive human machine interface, and the remote controller can be manufactured as various properties, such as a bat, a racket and a club. Another kind of human machine interface may be operated without using any handheld device. For example, a pupil tracking device may perform the interactive operation according to the line of sight change of a user.

Referring to FIGS. 1A and 1B, FIG. 1A shows a conventional pupil tracking system which is configured to perform the pupil tracking of a human eye 9; and FIG. 1B shows a schematic diagram of the image of human eye captured by the conventional pupil tracking system. The pupil tracking system includes a display device 81, a light source 82, an image sensor 83 and a processing unit 84. The light source 82 is configured to emit light toward the human eye 9 so as to form a light image $I_{82}$ in the human eye 9 as shown in FIG. 1B. The image sensor 83 is configured to capture an image of human eye containing a pupil 91 and the light image 182, and the processing unit 84 is configured to calculate the variation of a relative distance D between the pupil 91 and the light image $I_{82}$ in the image of human eye so as to track the pupil 91 and to accordingly control the motion of a cursor 811 shown on the display device 81. However, if there is another ambient light (not shown) forming an ambient light image $I_0$ in the image of human eye, errors can occur in pupil tracking.

In addition, the time that people operate a device having a display screen within a day becomes longer and longer, and thus the protection of human eyes becomes more important.

SUMMARY

The present disclosure provides an image system with the eye protection and an operating method thereof that automatically switch off a display screen according to an operating distance of a user and/or ambient light strength.

The present disclosure provides an electronic system including an image sensor, a display screen and a signal processor. The image sensor has a predetermined field of view and is configured to capture an image. The signal processor is electrically coupled to the image sensor and the display screen, and configured to recognize a mouse and eyes of a user in the image, and control the display screen to show a warning notice when the eyes are recognized in the image but the mouth is not recognized in the image, and switch off the display screen when the warning notice is not turned off within a predetermined time interval.

The present disclosure further provides an electronic system including an image sensor, a signal processor and a display screen. The image sensor has a predetermined field of view and is configured to capture an image. The signal processor is electrically coupled to the image sensor, and configured to recognize a mouth and eyes of a user in the image. The display screen is configured to display with a brightness when (i) the eyes are recognized in the image by the signal processor and (ii) the mouth is recognized in the image by the signal processor, and reduce the brightness when the eyes are recognized in the image by the signal processor but the mouth is not recognized in the image by the signal processor due to the user being too close to the display screen.

The present disclosure further provides an electronic system including an image sensor, a display screen and a signal processor. The image sensor has a predetermined field of view and is configured to capture an image. The signal processor is electrically coupled to the image sensor and the display screen, and configured to recognize a mouth and eyes of a user in the image, and control a speaker to play a warning voice when the eyes are recognized in the image but the mouth is not recognized in the image due to the user being too close to the display screen.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
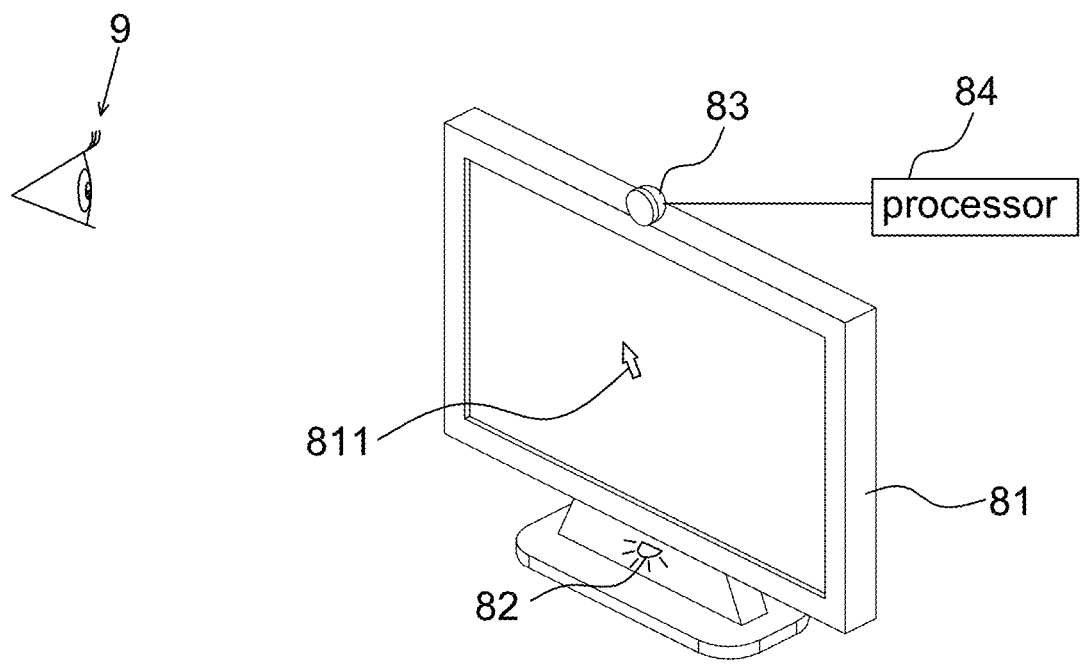
FIG. 1A shows a schematic diagram of the conventional pupil tracking system.
Figure 1B:
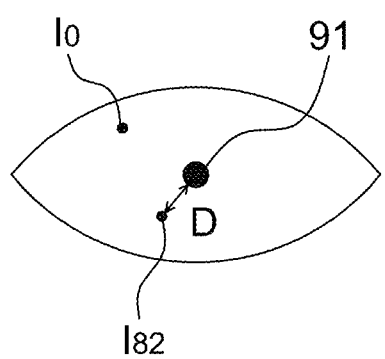
FIG. 1B shows a schematic diagram of the image of human eye captured by the conventional pupil tracking system.
Figure 2:
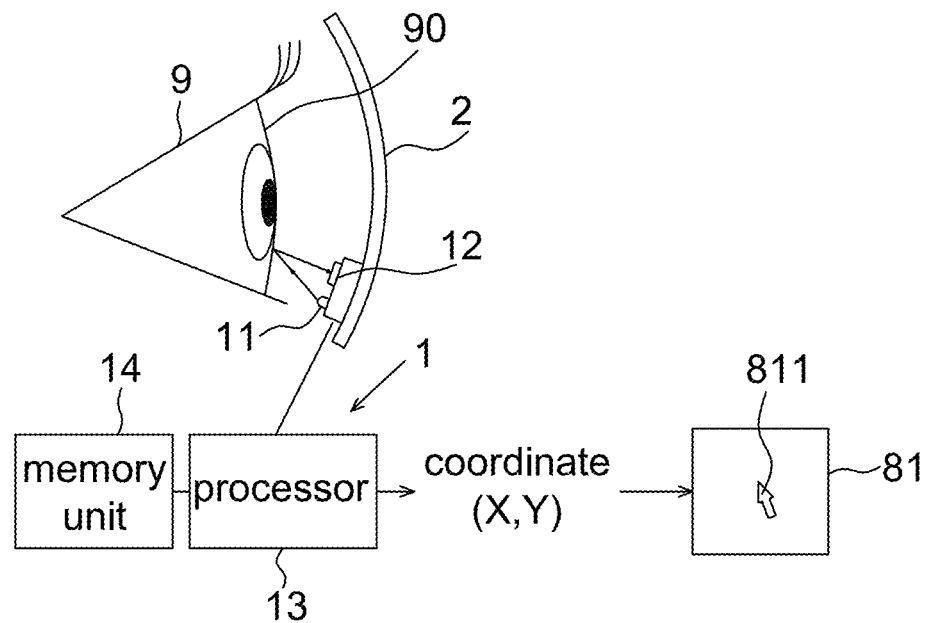
FIG. 2 shows an operational schematic diagram of the pupil detection device according to an embodiment of the present disclosure.

Referring to FIG. 2, it shows an operational schematic diagram of the pupil detection device 1 according to an embodiment of the present disclosure. The pupil detection device 1 is configured to detect a pupil position of an eyeball 90 and to output a pupil coordinate associated with the pupil position. The pupil detection device 1 includes an active light source 11, an image sensor 12 and a processing unit 13. Generally speaking, when the eyeball 90 looks downward the eyelid may cover a part of the eyeball 90. Therefore, if the pupil detection device 1 is disposed on a head accessory 2, a disposed position of the image sensor 12 is preferably lower than the eyeball 90. For example in FIG. 2, when the pupil detection device 1 is disposed on eyeglasses or a goggle, the pupil detection device 1 is preferably disposed at the lower frame thereof such that the pupil can be detected even though the eyeball 90 looks downward (i.e. the pupil directing downward).

The active light source 11 may be an infrared light source, e.g. an infrared light emitting diode, in order not to influence the line of sight when lighting. The active light source 11 emits light toward the eyeball 90. It should be mentioned that the active light source 11 may be a single light source or formed by arranging a plurality of light sources.

The image sensor 12 may be a photosensor configured to sense optical energy, such as a CCD image sensor, a CMOS image sensor or the like. The image sensor 12 captures at least one image frame of the eyeball 90 with a resolution and the captured image frame is served as an image to be identified.

Figure 3A:
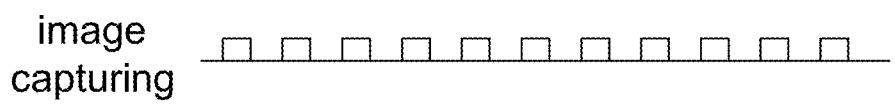
FIGS. 3A-3C show schematic diagrams of the image capturing and the lighting of the light source in the pupil detection device according to the embodiment of the present disclosure.
Figure 3B:
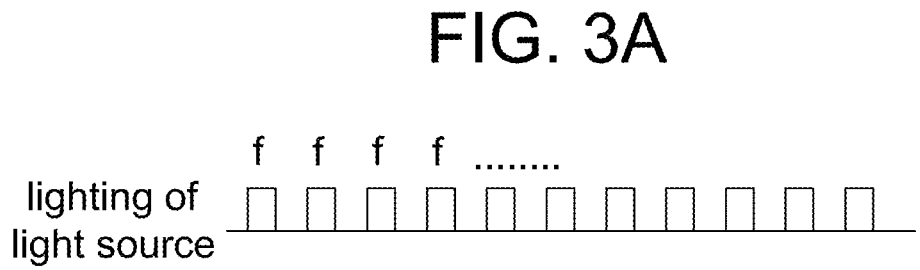
Figure 3C:
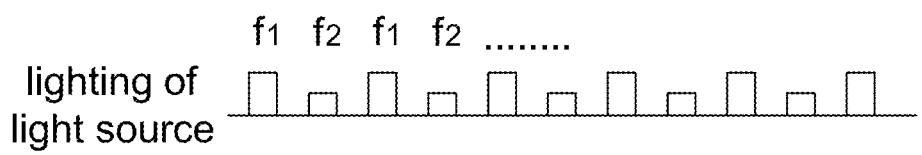
Figure 4:
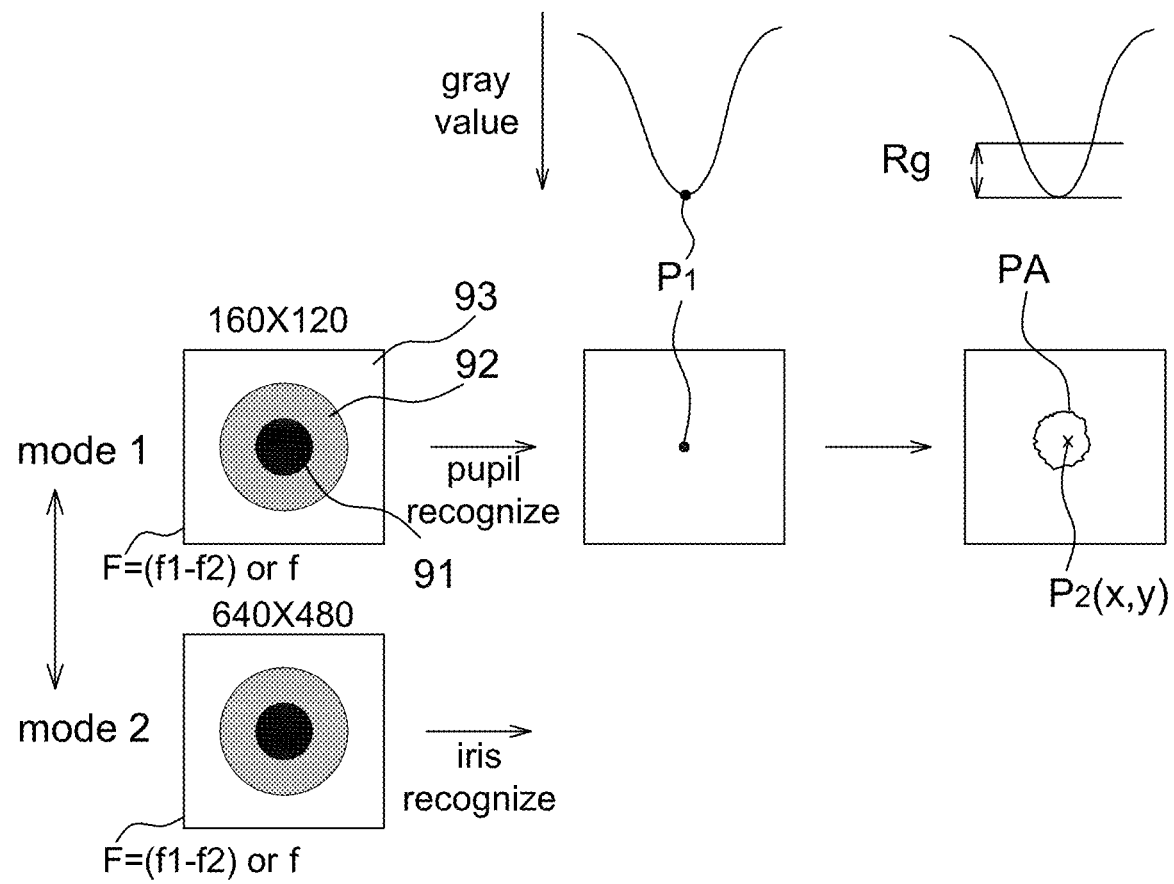
FIG. 4 shows a schematic diagram of performing the pupil detection according to an image to be identified captured by the pupil detection device according to the embodiment of the present disclosure.

For example referring to FIGS. 3A-3C and 4, FIGS. 3A-3C show schematic diagrams of the image capturing of the image sensor 12 and the lighting of the active light source 11; and FIG. 4 shows a schematic diagram of performing the pupil detection according to the image to be identified captured by the image sensor 12. The image sensor 12 captures image frames of the eyeball 90 at a frame rate to be served as images to be identified F. In one embodiment, the active light source 11 emits light with a fixed brightness value and corresponding to the image capturing of the image sensor 12 (FIG. 3B), and the image sensor 12 sequentially outputs image frames f to be served as the image to be identified F (i.e. F=f), wherein the image to be identified F may include a pupil 91, an iris 92 and the white of the eye 93. In another embodiment, the active light source 11 emits light alternatively in a first brightness value and a second brightness value, and the image sensor 12 captures a first image frame f1 corresponding to the first brightness value and a second image frame f2 corresponding to the second brightness value (FIG. 3C). The processing unit 13 calculates a differential image (f1−f2) of the first image frame f1 and the second image frame f2 to be served as the image to be identified F; i.e. F=(f1−f2). It should be mentioned that the first brightness value may not be equal to the second brightness value and both brightness values are not equal to zero. Accordingly, the processing unit 13 may eliminate the influence from ambient light sources by calculating the differential image (f1−f2).

The processing unit 13 may be a digital signal processor (DSP), and is configured to calculate a minimum gray value $P_1$ in the image to be identified F and to identify a plurality of pixels surrounding the minimum gray value $P_1$ and having gray values within a gray value range Rg as a pupil area PA, as shown in FIG. 4. When the active light source 11 turns on, as the pupil 91 has a lowest brightness value, the white of the eye 93 has a highest brightness value and the iris 92 has a brightness value between that of the pupil 91 and the white of the eye 93, the minimum gray value $P_1$ will appear inside the pupil 91. Therefore, a pixel area surrounding the minimum gray value $P_1$ may be identified as the pupil area PA, and the pixel area neighboring the minimum gray value $P_1$ may be correlated as a single object using the image grouping technique, which may be referred to U.S. Patent Publication No. 2011/0176733, entitled "image recognition method" and assigned to the same assignee of the present application, and the full disclosure of which is incorporated herein by reference. In addition, the setting of the gray value range Rg may be adjusted according to the operation environment of the pupil detection device 1, e.g. different gray value ranges Rg may be set for indoors and outdoors. Furthermore, in order to eliminate the noise interference, the processing unit 13 may further identify whether the pupil area PA is an image of ambient light source according to its features such as the size and shape thereof. For example, if the pupil area PA is too small or not an approximate circle, it may be an image of ambient light source and can be removed.

Next, the processing unit 13 may calculate a gravity center or a center of the pupil area PA to be served as a pupil position $P_2$ and output a pupil coordinate (x,y) associated with the pupil position $P_2$. The processing unit 13 may relatively control the motion of a cursor 811 shown on a display device 81 according to the pupil coordinate (x,y). It is appreciated that the pupil position $P_2$ may not be the same as a position of the minimum gray value $P_1$.

In addition, as the pupil detection device 1 may be configured to control an electronic device, in some cases the pupil detection device 1 may preferably recognize the user ID so as to increase the practicability or realize the privacy protection. Therefore, the processing unit 13 may perform the iris recognition according to the image to be identified F. In this case the pupil detection device 1 may further include a memory unit 14 configured to save the iris information of different users. In addition, as the iris recognition needs a higher image resolution and the pupil area identification needs a lower image resolution, in this embodiment a resolution and a frame rate of the image sensor 12 may be adjustable. For example, when the processing unit 13 is configured to perform the iris recognition (e.g. a second mode), the image sensor 12 may capture image frames with a first resolution and a first frame rate, whereas when the processing unit 13 is configured to identify the pupil area (e.g. a first mode), the image sensor 12 may capture image frames with a second resolution and a second frame rate, wherein the first resolution may be higher than the second resolution and the first frame rate may be lower than the second frame rate. In this embodiment, an adjustable range of the image resolution may be between 640×480 and 160×120, and an adjustable range of the frame rate may be between 30 FPS and 480 FPS (frame/second), but the present disclosure is not limited thereto.

In this embodiment, as the processing unit 13 performs the pupil detection based on the minimum gray value in the eyeball image, it is able to eliminate the interference from ambient light sources since the ambient light image has a higher gray value. In addition, it is able to further eliminate the ambient light image by calculating the differential image.

In another embodiment, the pupil detection device 1 may include more than two image sensors configured to capture image frames of the same eyeball and to accordingly calculate a three-dimensional pupil position and cover a larger detection range; i.e. the two image sensors configured to capture image frames of the same eyeball may be separated by a predetermined distance.

Figure 5A:
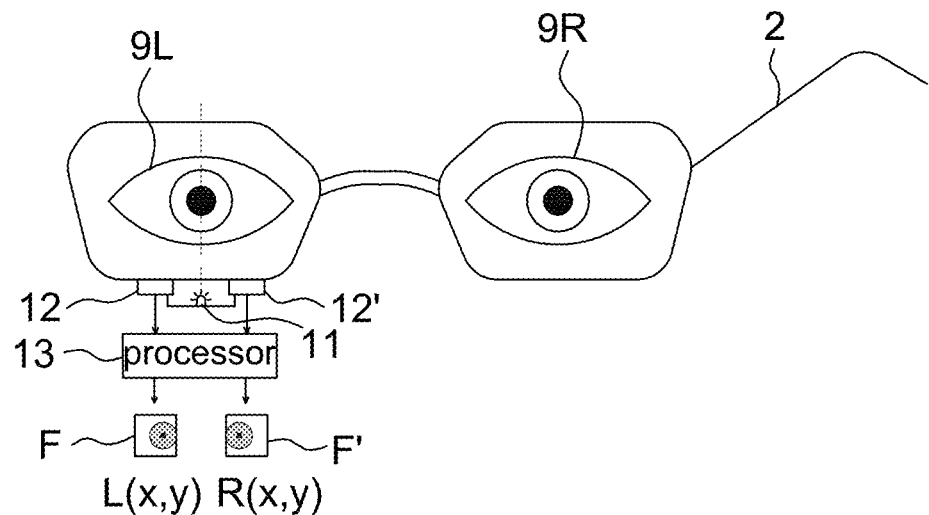
FIG. 5A shows an operational schematic diagram of the pupil detection device according to another embodiment of the present disclosure.

Referring to FIG. 5A, it shows a schematic diagram of the pupil detection device 1 according to another embodiment of the present disclosure. Although the pupil detection device 1 is shown to be disposed on eyeglasses, the present disclosure is not limited thereto. The pupil detection device 1 includes at least one active light source 11, two image sensors 12, 12' and a processing unit 13. It should be mentioned that in this embodiment a plurality of active light sources 11 may be used to improve the illumination (e.g. the active light source 11 may be formed by arranging a plurality of light sources); and a number of the image sensors 12, 12' is not limited to two. If three, four or more image sensors are included, each of the image sensors operates similar to the image sensors 12, 12' and only their disposed positions are different. However, their disposed positions are also preferably lower than the human eye 9. In addition, although the pupil detection device 1 is shown to be arranged corresponding to the left eye 9L, it may also be arranged corresponding to the right eye 9R. That is, if the pupil detection device 1 is disposed on a head accessory 2, the two image sensors 12, 12' are preferably disposed lower than the left eye 9L or the right eye 9R.

The at least one active light source 11 emits light to illuminate a left eye 9L or a right eye 9R. The two image sensors 12, 12' capture, with a resolution, at least one image frame of the left eye 9L or the right eye 9R which is illuminated by the at least one active light source 11 to be served as a first image to be identified F and a second image to be identified F, wherein the two image sensors 12, 12' may or may not capture the image frames simultaneously. The processing unit 13 is configured to respectively calculate a minimum gray value $P_1$ in the first image to be identified F and the second image to be identified F, and to identify a plurality of pixels surrounding the minimum pixel value $P_1$ and having gray values within a gray value range Rg as a pupil area PA. After the pupil area PA is obtained, the processing unit 13 is further configured to calculate a gravity center or a center of the pupil area PA to be served as a pupil position $P_2$ as shown in FIG. 4 and to output a left pupil coordinate L(x,y) and a right pupil coordinate R(x,y). In this embodiment, as the pupil is detected by using two images to be identified F, F', the processing unit 13 may calculate a three-dimensional pupil position according to the pupil position $P_2$ in the first image to be identified F and the second image to be identified F. For example, the two image sensors 12, 12' may be respectively disposed at two sides of a center line of the human eye 9, and the processing unit 13 may calculate the three-dimensional pupil position according to the two images to be identified F, F.

As mentioned above, in order to eliminate the ambient light image, the processing unit 13 may respectively calculate a differential image at first and then identify the pupil area PA according to the differential image. In this case the at least one active light source 11 emits light alternatively in a first brightness value and a second brightness value; the two image sensors 12, 12' capture a first image frame f1 corresponding to the first brightness value and a second image frame f2 corresponding to the second brightness value (as shown in FIG. 3C); and the processing unit 13 may calculate a differential image (f1−f2) of the first image frame f1 and the second image frame f2 to be served as the first image to be identified F and the second image to be identified F.

Similarly, in this embodiment the processing unit 13 may perform the iris recognition according to the first image to be identified F and/or the second image to be identified F. When the processing unit 13 is configured to perform the iris recognition, the image sensor 12 captures image frames with a first resolution and a first frame rate, whereas when the processing unit 13 is configured to identify the pupil area, the image sensor 12 captures image frames with a second resolution and a second frame rate, wherein the first resolution may be higher than the second resolution, whereas the first frame rate may be lower than the second frame rate.

In another embodiment, the pupil detection device 1 may include more than two image sensors configured to respectively capture image frames of different eyes so as to output the detection result of the left eye and/or the right eye according to different conditions.

Figure 5B:
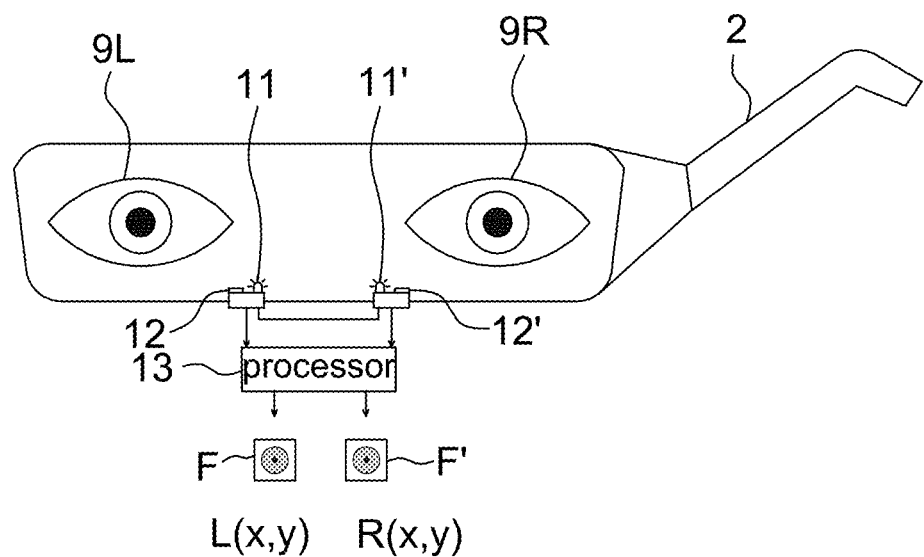
FIG. 5B shows an operational schematic diagram of the pupil detection device according to an alternative embodiment of the present disclosure.

Referring to FIG. 5B, it shows a schematic diagram of the pupil detection device 1 according to an alternative embodiment of the present disclosure. Although the pupil detection device 1 is shown to be disposed on a goggle, but the present disclosure is not limited thereto. The pupil detection device 1 includes two active light sources 11, 11', two image sensors 12, 12' and a processing unit 13. It should be mentioned that more than one active light source may be used corresponding to each human eye so as to improve the illumination; and a plurality of image sensors may be used corresponding to each human eye (as shown in FIG. 5A). Similarly, if the pupil detection device 1 is disposed on a head accessory 2, disposed positions of the two image sensors 12, 12' are preferably lower than the left eye 9L and the right eye 9R.

The two active light sources 11, 11' emit light to respectively illuminate a left eye 9L and a right eye 9R. The two image sensors 12, 12' respectively capture, with a resolution, at least one image frame of the left eye 9L and the right eye 9R to be served as a first image to be identified F and a second image to be identified F'. The processing unit 13 is configured to respectively calculate a minimum gray value $P_1$ in the first image to be identified F and the second image to be identified F', and to identify a plurality of pixels surrounding the minimum gray value $P_1$ and having gray values within a gray value range Rg as a pupil area PA. After the pupil area PA is obtained, the processing unit 13 may calculate a gravity center or a center of the pupil area PA to be served as a pupil position $P_2$ (as shown in FIG. 4) and output a left pupil coordinate L(x,y) and a right pupil coordinate R(x,y). As two pupils are respectively detected using different images to be identified in this embodiment, coordinates of the two pupils may be respectively calculated and different pupil coordinates may be outputted according to different conditions. For example when the human eye looks rightward, the left eye 9L may be blocked by the nose bridge and not be able to see the object at the right hand side, the processing unit 13 may only calculate a right pupil coordinate R(x,y) associated with the right eye 9R according to the pupil position. For example when the human eye looks leftward, the right eye 9R may be blocked by the nose bridge and not be able to see the object at the left hand side, the processing unit 13 may only calculate a left pupil coordinate L(x,y) associated with the left eye 9L according to the pupil position. In other conditions the processing unit 13 may calculate an average pupil coordinate associated with the left eye 9L and the right eye 9R according to the pupil position. The present disclosure is not limited to the conditions above.

In another embodiment, it is able to estimate a gaze direction or a gaze distance according to the relationship between the left pupil coordinate L(x,y) and the right pupil coordinate R(x,y).

In another embodiment, if more than two image sensors are respectively arranged corresponding to the left eye 9L and the right eye 9R, three-dimensional pupil positions of the left eye 9L and the right eye 9R may be respectively obtained.

As mentioned above, in order eliminate the ambient light image, the processing unit 13 may respectively calculate a differential image at first and then identify the pupil area PA according to the differential image. In this case the two active light sources 11 emit light alternatively in a first brightness value and a second brightness value; the two image sensors 12, 12' capture a first image frame f1 corresponding to the first brightness value and a second image frame f2 corresponding to the second brightness value (as shown in FIG. 3C); and the processing unit 13 may calculate a differential image (f1−f2) of the first image frame f1 and the second image frame f2 to be served as the first image to be identified F and the second image to be identified F'.

Similarly, in this embodiment the processing unit 13 may perform the iris recognition according to the first image to be identified F and/or the second image to be identified F'. When the processing unit 13 is configured to perform the iris recognition, the image sensors 12, 12' may capture image frames with a first resolution and a first frame rate, whereas when the processing unit 13 is configured to identify the pupil area, the image sensors 12, 12' may capture image frames with a second resolution and a second frame rate, wherein the first resolution may be higher than the second resolution, whereas the first frame rate may be lower than the second frame rate.

In addition, the pupil detection device 1 of each embodiment of the present disclosure may cooperate with a display unit for displaying images, and the display unit may also be disposed on the head accessory 2, such as eyeglasses or a goggle.

The pupil detection device 1 of each embodiment of the present disclosure may further have the function of blinking detection. For example, the processing unit 13 may record time intervals during which the pupil is detected and is not detected so as to identify the blinking operation.

The pupil detection device 1 of each embodiment of the present disclosure may further have the function of doze detection and distraction detection. For example, when the pupil detection device 1 is applied to a vehicle device, it is able to detect whether the driver is sleepy or pays attention to a forward direction and to give a warning at a proper time. The doze detection may be implemented by detecting a time ratio between eye open and eye close. The distraction detection may be implemented by detecting a gaze direction of the driver.

The pupil detection device 1 of each embodiment of the present disclosure may further have the function of blinking frequency detection and dry eye detection. Specifically speaking, the processing unit 13 may estimate the possibility and degree of the dry eye according to the detected blinking frequency and then remind the user to blink his or her eyes.

The pupil detection device 1 of each embodiment of the present disclosure may further have the function of gesture recognition. The gesture recognition may be performed by moving the pupil toward a predetermined direction for a predetermined times and comparing the pupil movement with a predetermined gesture so as to execute specific functions. The gesture recognition is similar to those performed by other objects rather than the pupil, such as the gesture recognition performed by a hand motion or a finger motion.

The pupil detection device 1 of each embodiment of the present disclosure may further have the function of power saving. For example, the power save mode may be entered if the pupil is not detected for a predetermined time interval or the image variation of the image to be identified is too small.

It should be mentioned that the pupil detection device 1 of each embodiment of the present disclosure may be directly manufactured as a head pupil detection device or be attached to a head accessory, e.g. eyeglasses, a goggle or a hat edge via a combining element. In other embodiments, the pupil detection device 1 of each embodiment of the present disclosure may be disposed at other positions for performing the pupil detection, e.g. disposed in a car and close to the user's eyes (e.g. on a rearview mirror) as long as it is disposed at a position capable of detecting the human eye 9.

Figure 6:
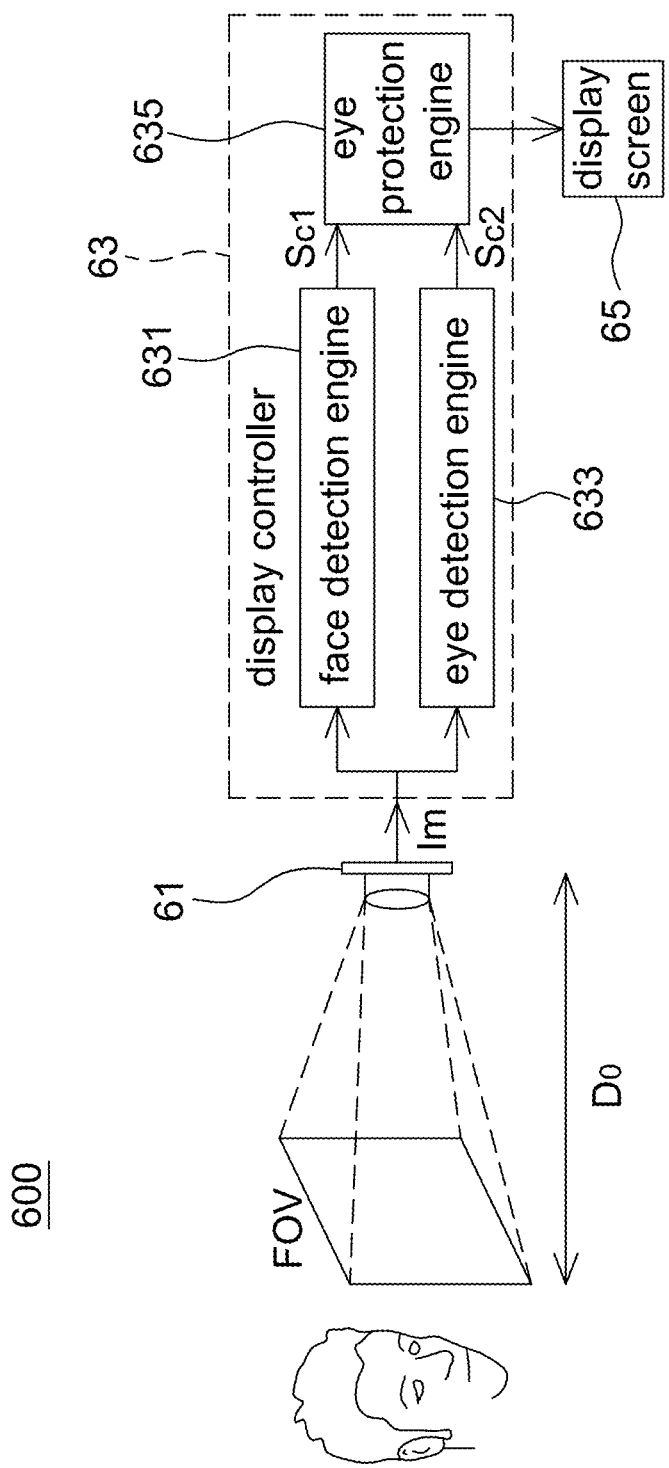
FIG. 6 is a schematic block diagram of an image system according to one embodiment of the present disclosure.

Referring to FIG. 6, it is a schematic block diagram of an image system according to one embodiment of the present disclosure. The image system 600 includes an image sensor 61, a display screen 65 and a display controller 63, wherein the display controller 63 is used to analyze an image Im captured by the image sensor 61 and control the display screen 65, e.g., controlling the ON/OFF and/or displaying brightness. The display controller 63 is implemented by software, hardware, firmware or a combination thereof according to different applications. For example, the display controller 63 is a digital signal processor (DSP), microcontroller (MCU), an application specific integrated circuit (ASIC), a central processing unit (CPU) or the like.

Figure 7:
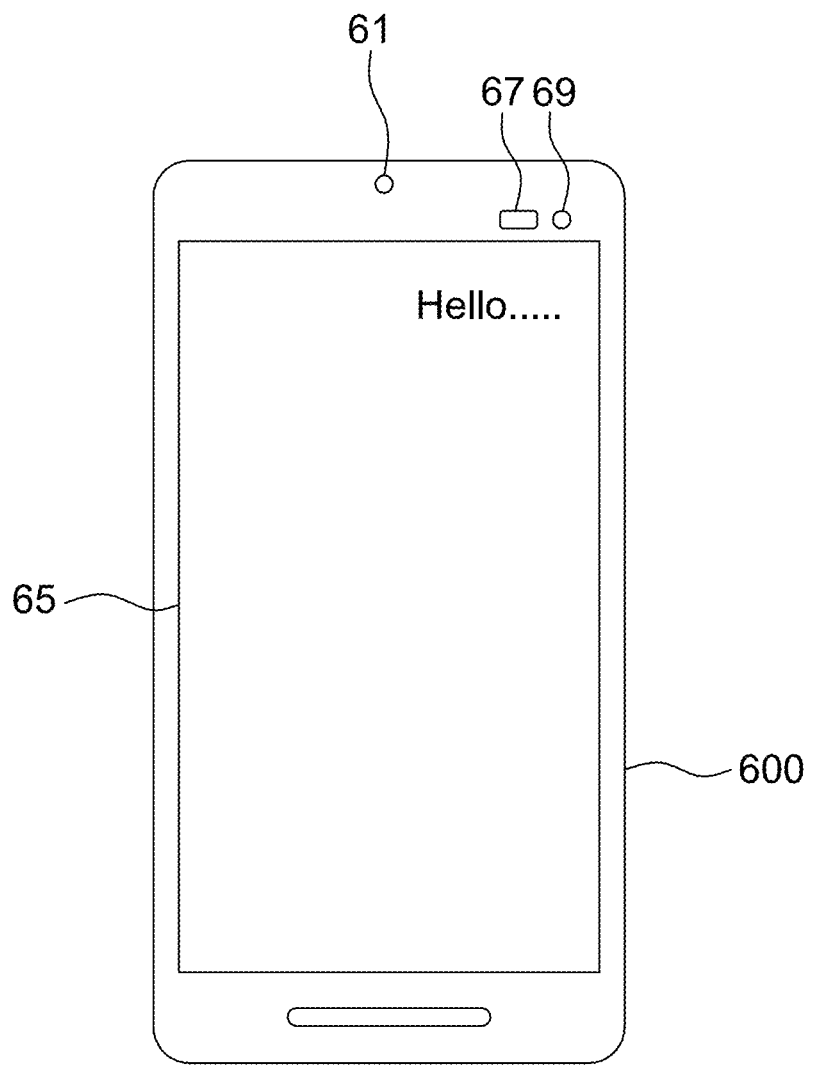
FIG. 7 is a schematic diagram of an image system according to one embodiment of the present disclosure.

The image system 600 is integrated on an electronic device having a display screen 65 as shown in FIG. 7. Although the electronic device is shown as a cell phone in FIG. 7, it is only intended to illustrate but not to limit the present disclosure. The electronic device is, for example, a cell phone, a smart phone, a personal digital assistance (PDA), a notebook computer, a tablet computer, a desktop computer, a television, a monitor, a vehicle-mounted central control system or the like without particular limitations. The image system 600 has the eye protection function that closes the display screen 65 or reduces brightness of the display screen 65 according to an operating distance of a user and/or ambient light intensity. The display screen 65 operates normally when the user is at an appropriate distance from the display screen 65 and when ambient light is strong enough.

The image sensor 61 has a predetermined field of view (FOV) and configured to capture an image Im, e.g., acquiring an image containing a part of a human face in operation, at a sampling rate. The predetermined field of view (FOV) of the image sensor 61 is previously arranged according to an operable range Do of the image system 600. For example, the operable range Do is arranged to allow a complete human face to appear within the FOV of the image sensor 61 when the human face is farther than the operable range Do. For example, the operable range Do is preferably between 25 cm to 50 cm which may be determined according to a size of the display screen 65. For example, when the size of the display screen 65 is large, a user may watch pictures shown on the display screen 65 at a farther distance and thus the operable range Do is set longer; on the contrary, when the size of the display screen 65 is small, the user watches pictures shown on the display screen 65 at a shorter distance and thus the operable range Do is set shorter. As long as the operable range Do is determined, it is able to design the FOV of the image sensor 61.

In the present disclosure, the image sensor 61 preferably has a low resolution (e.g., hundreds of pixels), low sampling rate (e.g., few hertz) and low power consumption. For example, the image sensor 61 is a CMOS image sensor having a sensor array having hundreds of pixels. Accordingly, the image sensor 61 may operate full-timely without consuming too much power when the power of the image system 600 is switched on. In some embodiments, the image sensor 61 is always turned on and captures images at the sampling rate when a predetermined Application (APP) is executed by the image system 600. Said predetermined Application is, for example, a game, a video player, a web browser, an Office file or the like. Said predetermined Application is activated, for example, by a user single clocking or double clicking an icon shown on the display screen 65 or by a voice instruction.

Since the image sensor 61 of the present disclosure is used to capture the image Im exclusive to controlling the display screen 65, the image sensor 61 is further set in addition to a conventional proximity sensor and a camera. For example referring to FIG. 7, an image system 600 (taking a smart phone as an example for illustration herein) includes a proximity sensor 67 for detecting whether an object is close to the image system 600 and a camera 69 for capturing a picture to be displayed on the display screen 65 or stored in a memory. The proximity sensor 67 senses information of light intensity, and the camera 69 has an extremely high resolution, e.g., millions of pixels. In the present disclosure, the image sensor 61 is not the proximity sensor 67 or the camera 69.

The display screen 65 is a liquid crystal display (LCD), a plasma display, an organic light emitting diode (OLED) display or the like for displaying pictures thereon. It is appreciated that those pictures displayed on the display screen 65 are determined according to the APP (software application) being run on the image system 600. The display screen 65 is controlled by the display controller 63 to be switched off. It should be mentioned that the "switch off" mentioned herein is referred to turning off the backlight of the display screen 65, rotating liquid crystal molecules to block the light penetration or cutting off the electricity being provided to the display screen 65 or the like without particular limitations as long as there is no picture is shown thereon.

The display controller 63 is electrically coupled to the image sensor 61 and the display screen 65, and used to control the display screen 65 according to the image Im captured by the image sensor 61. The display controller 63 is able to control the display screen 65 according to a single image Im. The display controller 63 includes a face detection engine 631, an eye detection engine 633 and an eye protection engine 635. The face detection engine 631 and the eye detection engine 633 are machine learning engines which are trained to recognize a face and eyes respectively.

For example, the face detection engine 631 and the eye detection engine 633 are implemented by an adaptive boosting or a convolution neural network, and trained before shipment of the image system 600 to respectively recognize the face and eyes. As mentioned above, the face detection engine 631 and the eye detection engine 633 are implemented by software, hardware, firmware or a combination thereof.

The face detection engine 631 is electrically coupled to the image sensor 61 to receive an image Im therefrom. The face detection engine 631 is used to recognize a face in the image Im. For example, the face detection engine 631 sends a digital value "1" as a first control signal $S_{c1}$ to the eye protection engine 635 when the face is recognized or detected, and sends a digital value "0" as the first control signal $S_{c1}$ to the eye protection engine 635 when the face is not recognized or detected, but the present disclosure is not limited thereto. The face detection engine 631 may transmit other digital values (e.g., two or more bits) to inform the eye protection engine 635.

In some embodiments, a face being recognized herein is referred to a complete face appearing within an image Im or within a window of interest (WOI) selected from the image Im. More specifically, the face detection engine 631 is trained to identify a complete face in the image Im or within the WOI selected from the image Im. In other embodiments, a face being recognized herein is referred to both the eyes and a mouth are recognized or detected within an image Im or within the WOI selected from the image Im. The setting of a face being recognized (determined according to the machine learning) directly affects the size of FOV and WOI and further determines the operable range Do of the image system 600. Accordingly, it is able to previously determine the FOV or WOI according to an operable range Do before shipment, or to determine the operable range Do by selecting an appropriate FOV or WOI before shipment.

The eye detection engine 633 is electrically coupled to the image sensor 61 to receive an image Im therefrom. The eye detection engine 633 is used to recognize eyes in the image Im. For example, the eye detection engine 633 sends a digital value "1" as a second control signal $S_{c2}$ to the eye protection engine 635 when the eyes are recognized or detected, and sends a digital value "0" as the second control signal $S_{c2}$ to the eye protection engine 635 when the eyes are not recognized or detected, but the present disclosure is not limited thereto. The eye detection engine 633 may transmit other digital values (e.g., two or more bits) to inform the eye protection engine 635. Similar to the face detection engine 631, the eye detection engine 633 detects whether the eyes are within the image Im or within a window of interest of the image Im.

Figure 8A:
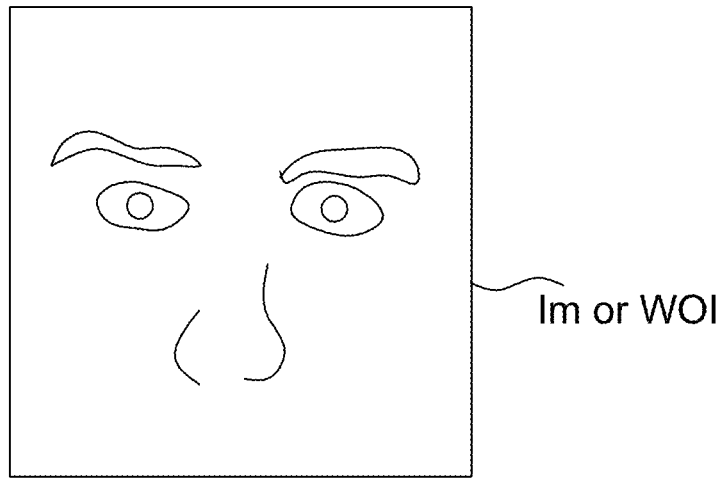
FIGS. 8A and 8B are images captured by an image sensor of an image system according to some embodiments of the present disclosure.
Figure 8B:
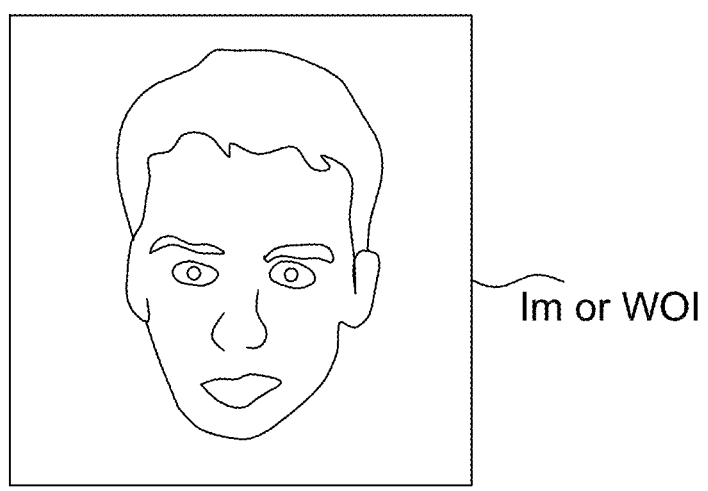

The eye protection engine 635 is electrically coupled to the display screen 65, the face detection engine 631 and the eye detection engine 633, and configured to switch off the display screen 65 when the eyes are recognized by the eye detection engine 633 but the face is not recognized by the face detection engine 631 (e.g., referring to FIG. 8A). More specifically, when the eyes are recognized but the face is not recognized, it means that a user is too close to the display screen 65 (or the image system 600) and thus the eye protection engine 635 turns off the display screen 65. When the eyes and face are both recognized, it means that the user is at a position farther than the operable range Do. Thus the display screen 635 is arranged to display pictures at a normal brightness when (i) the eyes are recognized by the eye detection engine 633 and (ii) the face is recognized by the face detection engine 631 (e.g., referring to FIG. 8B).

In some embodiments, the eye protection engine 635 is integrated in the display screen 65 such that the display screen 65 is aware of the digital values (e.g., the first control signal $S_{c1}$ and the second control signal $S_{c2}$) sent from the face detection engine 631 and the eye detection engine 633 to operate accordingly.

In some scenarios, when a user is too far from the image system 600 or the ambient light is too dark for the image sensor 61 to capture the face and eyes, the image system 600 identifies that it is not suitable for a user to watch the pictures shown on the display screen 65, and thus the display screen 65 is closed. Accordingly, the eye protection engine 635 is further configured to switch off the display screen 65 when the face is not recognized or detected by the face detection engine 631 and the eyes are also not recognized or detected by the eye detection engine 633.

In some embodiments, the display screen 65 is not totally turned off when a user is too close to the display screen 65. For example, the display screen 65 is configured to display the pictures at a protection brightness which is below 30% of the normal brightness when the eyes are recognized or detected by the eye detection engine 633 but the face is not recognized or detected by the face detection engine 631. More specifically, it is possible that the display screen 65 displays pictures using different brightness according to the recognition result of the display controller 63 to fulfill different operation scenarios.

As mentioned above, the display controller 63 (including the face detection engine 631, the eye detection engine 633 and the eye protection engine 635) is activated only when a predetermined Application is executed or run by the image system 600 so as to reduce the power consumption of the image system 600. The display controller 63 may be totally shut down before the predetermined Application is executed or run by the image system 600.

As mentioned above, it is possible to determine an operable range Do according to the FOV of the image sensor 61. However, since the FOV cannot be changed by the user, it is possible to change the operable range Do by selecting a WOI from the image Im captured by the image sensor 61 by a user using a setting stage of a user interface of the image system 600, wherein the WOI is a pixel region smaller than a size of the image Im captured by the image sensor 61 or smaller than a size of a sensor array of the image sensor 61. More specifically, the image system 600 has a predetermined operable range Do determined by the FOV of the image sensor 61 before shipment, and a user is able to select a new operable range Do by changing the WOI during operation.

In this embodiment, the face detection engine 631 is configured to select a window of interest (WOI) in the image Im and recognize whether the face is within the window of interest of the image Im. The eye detection engine 633 is configured to select the window of interest (WOI) in the image Im and recognize whether the eyes are within the window of interest of the image Im. The eye protection engine 635 is configured to switch off the display screen 65 when the eyes are recognized within the window of interest of the image Im but the face is not recognized within the window of interest of the image Im (e.g., referring to FIG. 8A), and control the display screen 63 to display the pictures at a normal brightness when the eyes are recognized within the window of interest of the image Im and the face is also recognized within the window of interest of the image Im (e.g., referring to FIG. 8B). The display screen 63 is turned off when both the face and eyes are not recognized or detected within the window of interest of the image Im.

Figure 9:
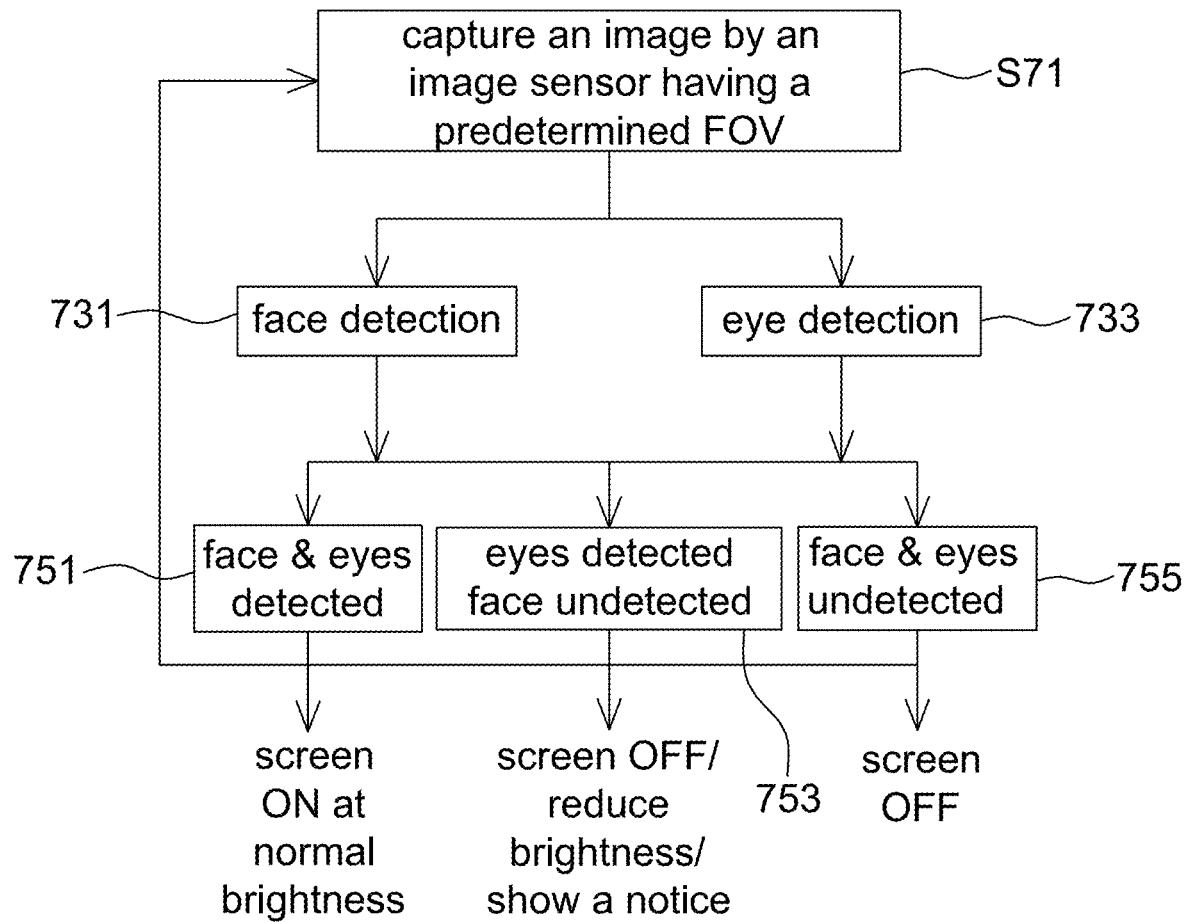
FIG. 9 is a flow chart of an operating method of an image system according to one embodiment of the present disclosure.

Referring to FIG. 9, it is a flow chart of an operating method of an image system according to one embodiment of the present disclosure including the steps of: capturing, by an image sensor, an image having hundreds of pixels (Step S71); recognizing, by a display controller, a face and eyes in the image (Step S731 and S733); displaying pictures on a display screen when both the face and the eyes are recognized in the image (Step S751); switching off the display screen by the display controller when the eyes are recognized in the image but the face is not recognized in the image (Step S753); and switching off the display screen by the display controller when both the face and the eyes are not recognized in the image (Step S755).

Please referring to FIGS. 6, 8A-8B and 9, details of this embodiment are illustrated hereinafter.

Step S71: The image sensor 61 has a predetermined field of view (FOV) and captures an image Im to be sent to the display controller 63. As mentioned above, the image sensor 61 of the present disclosure is used for controlling the ON/OFF of the image display 65, and it has much less pixels, e.g., hundreds of pixels, than the camera 69 such that it is turned on to successively capture images Im when the power of the image system 600 is switched on. In some embodiments, the image sensor 61 of the present disclosure is not operated before a predetermined Application (as mentioned above) is executed by the image system 600, and is activated to start to capture images at a predetermined low sampling frequency after the predetermined Application is executed.

Steps S731 and S732: The display controller 63 includes a face detection engine 631 and an eye detection engine 633 configured to respectively detect a face and eyes in the image Im captured by the image sensor 61. As mentioned above, the face detection engine 631 and the eye detection engine 633 are previously trained by machine learning to respectively recognize the face and eyes. The face detection engine 631 outputs a first control signal $S_{c1}$ (e.g., a digital value of one bit, two or more bits) indicating whether a face is recognized or detected. The eye detection engine 633 outputs a second control signal $S_{c2}$ (e.g., a digital value of one bit, two or more bits) indicating whether eyes are recognized or detected.

The display screen 65 is controlled by the display controller 63. As mentioned above, in one embodiment the display controller 63 may further include an eye protection engine 635 to control the ON/OFF of the display screen 65. In another embodiment, the eye protection engine 635 is included in the display screen 65 such that the display screen 65 receives the first control signal $S_{c1}$ and the second control signal $S_{c2}$ from the display controller 63. The display controller 63 is activated or turned on only when a predetermined Application (as mentioned above) is executed by the image system 600 to reduce the total power consumption. More specifically, the display controller 63 does not perform any calculation even the image sensor 61 captures images Im before the predetermined Application is run by the image system 600 (e.g., by double clicking by a user). More specifically, it is possible that the image sensor 61 and the display controller 63 are not operated together before the predetermined Application is run by the image system 600.

Step S751: When the face is detected or recognized by the display controller 63 (e.g., by the face detection engine 631 thereof) in the image Im and the eyes are detected or recognized by the display controller 63 (e.g., by the eye detection engine 633 thereof) in the image Im, it means that a user watches the display screen 65 at an appropriate distance and thus the display screen 65 display pictures with a normal brightness, wherein the normal brightness is set according to different designs.

Step S753: When the face (e.g., a complete face shape) is not detected or recognized by the display controller 63 (e.g., by the face detection engine 631 thereof) in the image Im but the eyes are detected or recognized by the display controller 63 (e.g., by the eye detection engine 633 thereof) in the image Im, it means that a user watches the display screen 65 too close to the display screen 65 and thus display controller 63 turns off the display screen 65 or controls the display screen 65 to display pictures with a protection brightness which is less than 30% of the normal brightness to protect the user's eyes.

Step S755: When the face (e.g., a complete face shape) is not detected or recognized by the display controller 63 (e.g., by the face detection engine 631 thereof) in the image Im and the eyes are also not detected or recognized by the display controller 63 (e.g., by the eye detection engine 633 thereof) in the image Im, it means that either ambient light is too weak or a user does not look at the display screen 65 at all, and thus the display controller 63 turns off the display screen 65. As mentioned above, the "turning off display screen" herein may be implemented by several ways as long as the display screen 65 does not substantially show any pictures thereon.

Figure 10:
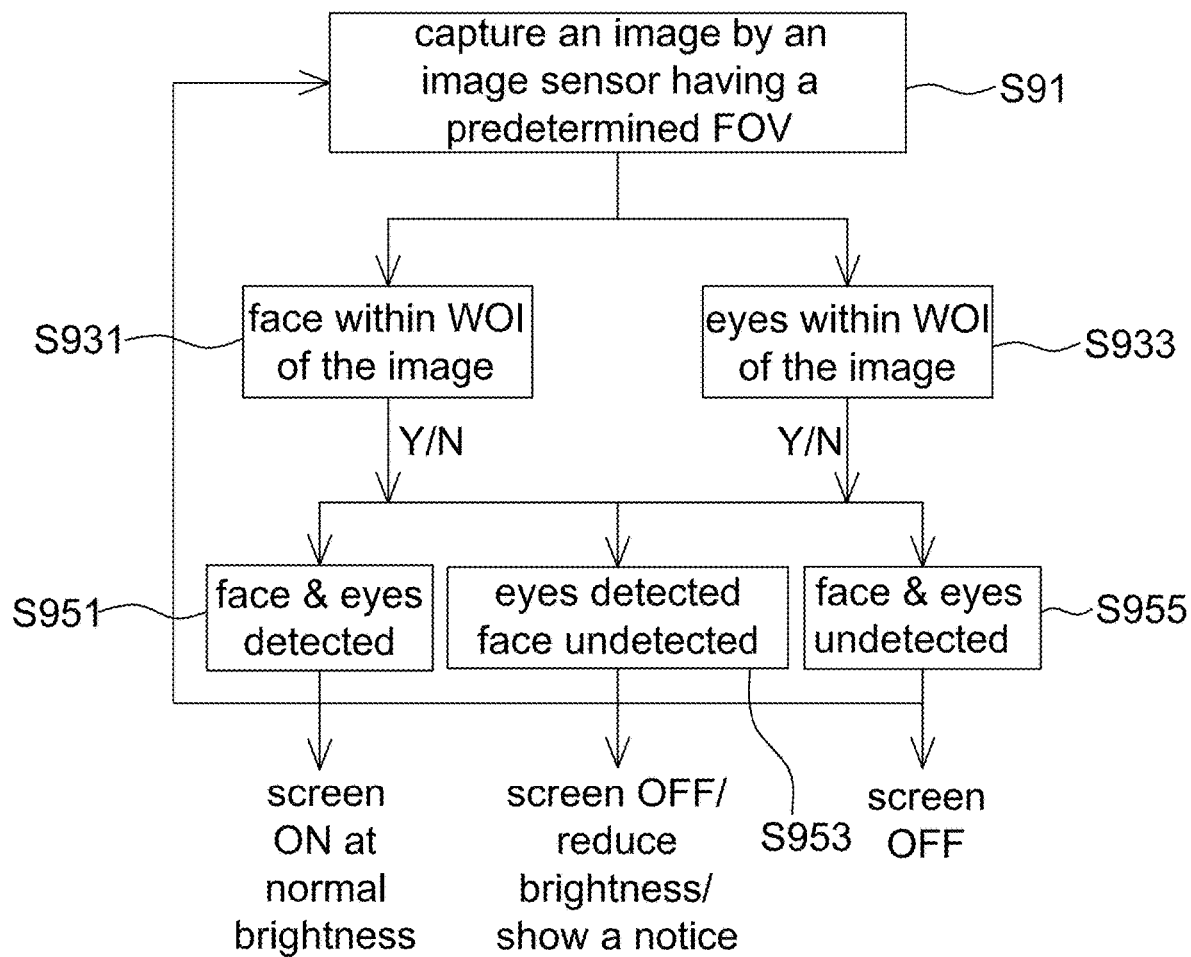
FIG. 10 is a flow chart of an operating method of an image system according to an alternative embodiment of the present disclosure.

Referring to FIG. 10, it is a flow chart of an operating method of an image system according to an alternative embodiment of the present disclosure. The difference between FIG. 9 and FIG. 10 is that in FIG. 10 the display controller 63 further selects a window of interest (WOI) from an image Im captured by the image sensor 61 if the FOV of the image sensor 61 does not fulfill the requirement of the user. That is, in FIG. 10, the operable distance Do is determined by the WOI. Therefore, in FIG. 10, the display controller 63 is configured to recognize whether the face and the eyes are in a window of interest of the image Im instead of recognizing whether the face and the eyes are in the whole image Im (Steps S931 and S933). The display controller 63 is configured to switch off or reduce the brightness (e.g. with a protection brightness) of the display screen 65 when the eyes are recognized in the window of interest of the image Im but the face is not recognized in the window of interest of the image Im (Step S953); and switch off the display screen 65 when the eyes are not recognized in the window of interest of the image Im and the face is also not recognized in the window of interest of the image Im (Step S955). The display screen 65 is controlled to display pictures at a normal brightness when the eyes are recognized in the window of interest of the image Im and the face is also recognized in the window of interest of the image Im (Step S951). In addition to changing the whole image to a window of interest of the image in the embodiment of FIG. 10, other details of FIG. 10 are similar to those of FIG. 9 and thus details thereof are not repeated herein.

In another embodiment, the eye protection engine 635 of the display controller does not directly switch off the display screen 65 in the Step 753 of FIG. 9 and the Step S953 in FIG. 10 but to control the display screen 65 to show a notice thereon or to control a speaker of the display screen 65 (or display device) to play a voice to warn a user that he/she is too close to the display screen 65. In this case, the display screen 65 may display with a relatively dark brightness but clearly show the notice with a relatively high brightness. The content of the notice is a properly designed warning message without particular limitations, e.g., too close, keep away or the like. The user may click on the notice or drag the notice out of the display screen 65 to turn off the warning notice, or the user may press a physical button to turn off the warning notice. If the notice is not turned off within a predetermined time interval, the eye protection engine 635 of the display controller then switches off the display screen 65.

In some embodiments, if the display controller continuously detects that the user is too close to the display screen 65, the notice is shown every a predetermined time interval, e.g., every 5 minutes, but not limited thereto.

As mentioned above, the eye protection becomes more and more important in modern life. Therefore, the present disclosure further provides an image system (FIG. 6-7) and an operating method thereof (FIGS. 9-10) that switch off or reduce brightness of a display screen when a user is too close to the display screen according to the appearance of a face and eyes in a captured image or in a selected window of interest of the captured image.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic system, comprising:
   an image sensor having a predetermined field of view and configured to capture an image;
   a display screen; and
   a signal processor electrically coupled to the image sensor and the display screen, and configured to
   recognize a mouth and eyes of a user in the image, and
   control the display screen to show a warning notice when the eyes are recognized in the image but the mouth is not recognized in the image, and switch off the display screen when the warning notice is not turned off within a predetermined time interval.

2. The electronic system as claimed in claim 1, further comprising:
   a proximity sensor configured to detect whether an object is close to the electronic system; and
   a camera configured to capture a picture to be displayed on the display screen or stored in a memory,
   wherein the image sensor is not included in the proximity sensor or the camera.

3. The electronic system as claimed in claim 1, wherein the signal processor is further configured to switch off the display screen when the mouth and the eyes are not recognized in the image.

4. The electronic system as claimed in claim 1, wherein the predetermined field of view of the image sensor is previously arranged according to an operable range of the electronic system.

5. The electronic system as claimed in claim 1, wherein the image sensor is turned on full-timely when a predetermined Application is running.

6. The electronic system as claimed in claim 1, wherein the signal processor is further configured to
   select a window of interest in the image and recognize whether the mouth and the eyes are within the window of interest of the image, and
   control the display screen to show the warning notice thereon when the eyes are recognized within the window of interest of the image but the mouth is not recognized within the window of interest of the image.

7. The electronic system as claimed in claim 6, wherein the window of interest of the image is previously selected according to an operable range of the electronic system.

8. An electronic system, comprising:
   an image sensor having a predetermined field of view and configured to capture an image;
   a signal processor electrically coupled to the image sensor, and configured to recognize a mouth and eyes of a user in the image; and
   a display screen configured to
      display with a brightness when (i) the eyes are recognized in the image by the signal processor and (ii) the mouth is recognized in the image by the signal processor, and
      reduce the brightness when the eyes are recognized in the image by the signal processor but the mouth is not recognized in the image by the signal processor due to the user being too close to the display screen.

9. The electronic system as claimed in claim 8, wherein the display screen is switched off when the eyes and the mouth are not recognized in the image by the signal processor.

10. The electronic system as claimed in claim 8, wherein the predetermined field of view of the image sensor is previously arranged according to an operable range of the electronic system.

11. The electronic system as claimed in claim 8, further comprising:
   a proximity sensor configured to detect whether an object is close to the electronic system; and
   a camera configured to capture a picture to be displayed on the display screen or stored in a memory,
   wherein the image sensor is not included in the proximity sensor or the camera.

12. The electronic system as claimed in claim 8, wherein the signal processor is further configured to select a window of interest in the image and recognize whether the mouth and the eyes are within the window of interest of the image, and
   the display screen is configured to display with the brightness when (i) the eyes are recognized within the window of interest of the image and (ii) the mouth is recognized within the window of interest of the image.

13. The electronic system as claimed in claim 12, wherein the window of interest of the image is previously selected according to an operable range of the electronic system.

14. An electronic system, comprising:
   an image sensor having a predetermined field of view and configured to capture an image;
   a display screen; and
   a signal processor electrically coupled to the image sensor and the display screen, and configured to
      recognize a mouth and eyes of a user in the image, and
      control a speaker to play a warning voice when the eyes are recognized in the image but the mouth is not recognized in the image due to the user being too close to the display screen.

15. The electronic system as claimed in claim 14, further comprising:
   a proximity sensor configured to detect whether an object is close to the electronic system; and
   a camera configured to capture a picture to be displayed on the display screen or stored in a memory,
   wherein the image sensor is not included in the proximity sensor or the camera.

16. The electronic system as claimed in claim 14, wherein the signal processor is further configured to switch off the display screen when the mouth and the eyes are not recognized in the image.

17. The electronic system as claimed in claim 14, wherein the image sensor is turned on full-timely when a predetermined Application is running.

18. The electronic system as claimed in claim 14, wherein the signal processor is further configured to
   select a window of interest in the image and recognize whether the mouth and the eyes are within the window of interest of the image, and
   control the speaker to play the warning voice when the eyes are recognized within the window of interest of the image but the mouth is not recognized within the window of interest of the image.

19. The electronic system as claimed in claim 18, wherein the window of interest of the image is previously selected according to an operable range of the electronic system.

20. The electronic system as claimed in claim 14, wherein the predetermined field of view of the image sensor is previously arranged according to an operable range of the electronic system.

* * * * *